(12) United States Patent
Kuras et al.

(10) Patent No.: US 10,464,565 B2
(45) Date of Patent: Nov. 5, 2019

(54) PROPULSION CONTROL SYSTEM WITH VARYING AGGRESSIVENESS OF RESPONSE

(71) Applicant: CATERPILLAR INC., Peoria, IL (US)

(72) Inventors: Brian Dean Kuras, East Peoria, IL (US); Sean Cameron Landers, Elmwood, IL (US); Sangameshwar Sonth, Dunlap, IL (US); Ankit Sharma, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 142 days.

(21) Appl. No.: 15/837,535

(22) Filed: Dec. 11, 2017

(65) Prior Publication Data
US 2019/0176826 A1  Jun. 13, 2019

(51) Int. Cl.
*B60W 30/18* (2012.01)
*B60W 30/188* (2012.01)
(Continued)

(52) U.S. Cl.
CPC ........ *B60W 30/1884* (2013.01); *B60W 10/06* (2013.01); *E02F 9/2253* (2013.01);
(Continued)

(58) Field of Classification Search
CPC .................... B60W 30/1884; B60W 2540/106
See application file for complete search history.

(56) References Cited

U.S. PATENT DOCUMENTS

| 5,231,898 A | 8/1993 | Okura |
| 6,038,504 A | 3/2000 | Cronin et al. |

(Continued)

*Primary Examiner* — Derek D Knight
(74) *Attorney, Agent, or Firm* — Finnegan, Henderson, Farabow, Garrett & Dunner, LLP

(57) ABSTRACT

A propulsion control system provides different levels of jerk as a function of operator inputs and actual measured operational parameters in a machine. The system includes a power source, a continuously variable transmission (CVT) coupled to an output of the power source, a plurality of input/output devices, a plurality of sensors configured to generate signals indicative of operational parameters of the machine, and a controller communicatively coupled with the power source, the CVT, the input/output devices, and the sensors. The controller includes a database stored in a memory with a plurality of jerk values mapped to different operations of the machine selected from at least one of activation of a brake by an operator for an aggressive stop, a directional shift request from an operator to select one of forward, reverse, or neutral, and a set of operating conditions of the machine indicative of a blade load shedding mode. A jerk selection module is programmed to select at least one of a jerk value, an acceleration limit value, and a deceleration limit value based on a current operation of the machine. A speed command generating device is programmed to integrate a selected jerk value twice to generate a desired speed command. A proportional-integral-derivative (PID) control device is configured to continuously calculate a control error between the desired speed command and an actual speed of the machine. An output command control module is configured to output a control command for implementing a change in an output torque to at least one of the power source and the CVT to reduce the control error.

20 Claims, 4 Drawing Sheets

(51) Int. Cl.
  *B60W 10/06* (2006.01)
  *E02F 9/22* (2006.01)
  *F16H 47/04* (2006.01)
  *F16H 61/06* (2006.01)
  *F16H 61/662* (2006.01)
  *F16H 37/08* (2006.01)

(52) U.S. Cl.
  CPC ........... *F16H 47/04* (2013.01); *F16H 61/061* (2013.01); *F16H 61/66254* (2013.01); *B60W 2540/106* (2013.01); *F16H 2037/0886* (2013.01)

(56) References Cited

U.S. PATENT DOCUMENTS

| | | | |
|---|---|---|---|
| 6,042,502 A * | 3/2000 | Cronin | F16H 47/04 |
| | | | 477/120 |
| 6,223,111 B1 | 4/2001 | Cronin et al. | |
| 6,633,805 B2 | 10/2003 | Burgart et al. | |
| 7,192,374 B2 | 3/2007 | Kuras et al. | |
| 8,316,983 B2 | 11/2012 | Shirao | |
| 8,452,470 B2 * | 5/2013 | Choi | B60K 6/48 |
| | | | 701/22 |
| 9,140,356 B2 | 9/2015 | Kamada | |
| 9,340,208 B1 | 5/2016 | Kuros et al. | |

* cited by examiner

PROPULSION CONTROL SYSTEM WITH VARYING AGGRESSIVENESS OF RESPONSE

TECHNICAL FIELD

The present disclosure relates generally to a propulsion control system for a machine and, more particularly, to a propulsion control system with varying aggressiveness of response.

BACKGROUND

Machines such as, for example, on-highway vocational vehicles, off-highway haul trucks, wheel loaders, motor graders, and other types of heavy machinery are used for a variety of tasks. These machines generally include a power source, which may embody, for example, an engine, such as a diesel engine, a gasoline engine, or a gaseous fuel-powered engine that provides the power required to complete these tasks. The power produced by the power source may be transmitted through a transmission, such as, for example, a continuously variable transmission ("CVT"), to one or more ground engaging devices or traction devices in order to propel the machine.

Machine control systems are often used to coordinate and regulate operation of the power source and CVT to improve the machine's responsiveness and efficiency. For example, while the machine is traveling the power source and CVT may have a range of speeds and torques at which the power source and CVT experience substantially stable and efficient operation. Operating outside of this range may increase fuel consumption and/or decrease responsiveness.

Machine velocity control schemes may utilize the reading of a speed pedal's displacement to create a jerk command. Jerk is defined as the second derivative of velocity and the first derivative of acceleration (or rate of change of acceleration). A high jerk value provides aggressive machine operation, however, it could cause the operator to lose control due to the rapid movement of the machine by creating unwanted speed pedal modulation. On the other hand, a low jerk value will provide time for the operator to react to unwanted speed pedal modulation. However, it can result in a relatively sluggish operation. The application of jerk has a linear slope so that the amount of jerk is constant throughout the full range of pedal displacement. A constant jerk value is a compromise that attempts to prevent either an overall sluggish operation or too much unwanted speed pedal modulation. Unfortunately, this results in too much jerk being present when the operator desires a greater degree of control and not enough jerk being present when the operator desires quick machine response.

One method for controlling a power source and CVT is disclosed in U.S. Pat. No. 7,192,374 (the '374 patent) issued to Kuras et al. on Mar. 20, 2007. The '374 patent discloses an engine underspeed control system that adjusts the transmission ratio so that the engine is running at an optimal speed condition (i.e., within a range of speeds where the engine is operating most efficiently). The control system of the '374 patent discloses an operator input that provides an input signal to a controller. The operator input, for example, could be an accelerator pedal that allows the operator to depress the pedal to request an increase in machine output speed. The input signal may represent a requested speed, which the controller then converts into a motor speed command (the motor being a component of a hydraulic CVT that is powered by an engine). The control system of the '374 patent prevents the motor speed command from exceeding an upper speed limit and from dropping below a lower speed limit. These limits are calculated such that, as long as the motor speed command remains within the upper and lower speed limits, the motor torque command will stay within the torque capability of the motor. The motor torque limit at a particular motor speed can be determined from the torque-speed curves for the motor. The engine underspeed control algorithm (implemented by the controller) will also reduce the motor speed command if the engine begins lugging (e.g., if the engine speed drops below a threshold value). The method of the '374 patent thus enables the CVT to respond quickly to changes in the motor speed command while preventing damage to the motor and transmission.

Although the machine of the '374 patent may help the motor remain responsive while preventing potential damage to the motor and transmission, it may not provide for the level of responsiveness desired by an operator under all conditions. By only controlling the motor speed, the control system of the '374 patent may allow the engine to operate at an inefficient and/or unresponsive engine speed (i.e., either too low or too high), or may result in an undesirable level of aggressiveness of response under certain operating conditions.

The disclosed propulsion control system is directed to overcoming one or more of the problems set forth above.

SUMMARY OF THE DISCLOSURE

In one aspect, the present disclosure is directed to a propulsion control system for providing different levels of jerk as a function of operator inputs and actual measured operational parameters in a machine. The propulsion control system may include a power source, a continuously variable transmission (CVT) coupled to an output of the power source, a plurality of input/output devices, a plurality of sensors configured to generate signals indicative of operational parameters of the machine; and a controller communicatively coupled with the power source, the CVT, the input/output devices, and the sensors. The controller may include a database stored in a memory with a plurality of jerk values mapped to different operations of the machine selected from at least one of activation of a brake by an operator for an aggressive stop, a directional shift request from an operator to select one of forward, reverse, or neutral, and a set of operating conditions of the machine indicative of a blade load shedding mode. A jerk selection module may be programmed to select at least one of a jerk value, an acceleration limit value, and a deceleration limit value based on a current operation of the machine. A speed command generating device may be programmed to integrate a selected jerk value twice to generate a desired speed command. A proportional-integral-derivative (PID) control device may be configured to continuously calculate a control error between the desired speed command and an actual speed of the machine. An output command control module may be configured to output a control command for implementing a change in an output torque to at least one of the power source and the CVT to reduce the control error.

In another aspect, the present disclosure is directed to a method of machine control. The method of machine control may include selecting a jerk value from a database stored in a memory including a plurality of jerk values mapped to different operations of the machine including at least one of activation of a brake by an operator for an aggressive stop, a directional shift request from an operator to select one of forward, reverse, or neutral, and a set of operating conditions of the machine indicative of a blade load shedding mode.

The method may include integrating the selected jerk value twice to generate a desired smooth speed command for the machine. The method may further include continuously calculating a control error between the desired speed command and an actual speed of the machine. The method may still further include outputting a control command for implementing a change in an output torque to at least one of a power source and a continuously variable transmission in a drivetrain of the machine.

In yet another aspect, the present disclosure is directed to an earthmoving machine. The machine may include, a power source, a traction device, a CVT operatively coupled to the power source to transmit output of the power source to the traction device, an implement, and a propulsion control system for providing different levels of jerk as a function of operator inputs and actual measured operational parameters of the machine. The propulsion control system may include a plurality of input/output devices, a plurality of sensors configured to generate signals indicative of operational parameters of the machine, and a controller communicatively coupled with the input/output devices, and the sensors. The controller may include a database stored in a memory with a plurality of jerk values mapped to different operations of the machine selected from at least one of activation of a brake by an operator for an aggressive stop, a directional shift request from an operator to select one of forward, reverse, or neutral, and a set of operating conditions of the machine indicative of an implement load shedding mode. A jerk selection module may be programmed to select at least one of a jerk value, an acceleration limit value, and a deceleration limit value based on a current operation of the machine. A speed command generating device may be programmed to integrate a selected jerk value twice to generate a desired speed command. A control device may be configured to continuously calculate a control error between the desired speed command and an actual speed of the machine. An output command control module may be configured to output a control command for implementing a change in an output torque to at least one of the power source and the CVT to reduce the control error.

DETAILED DESCRIPTION

Figure 1:
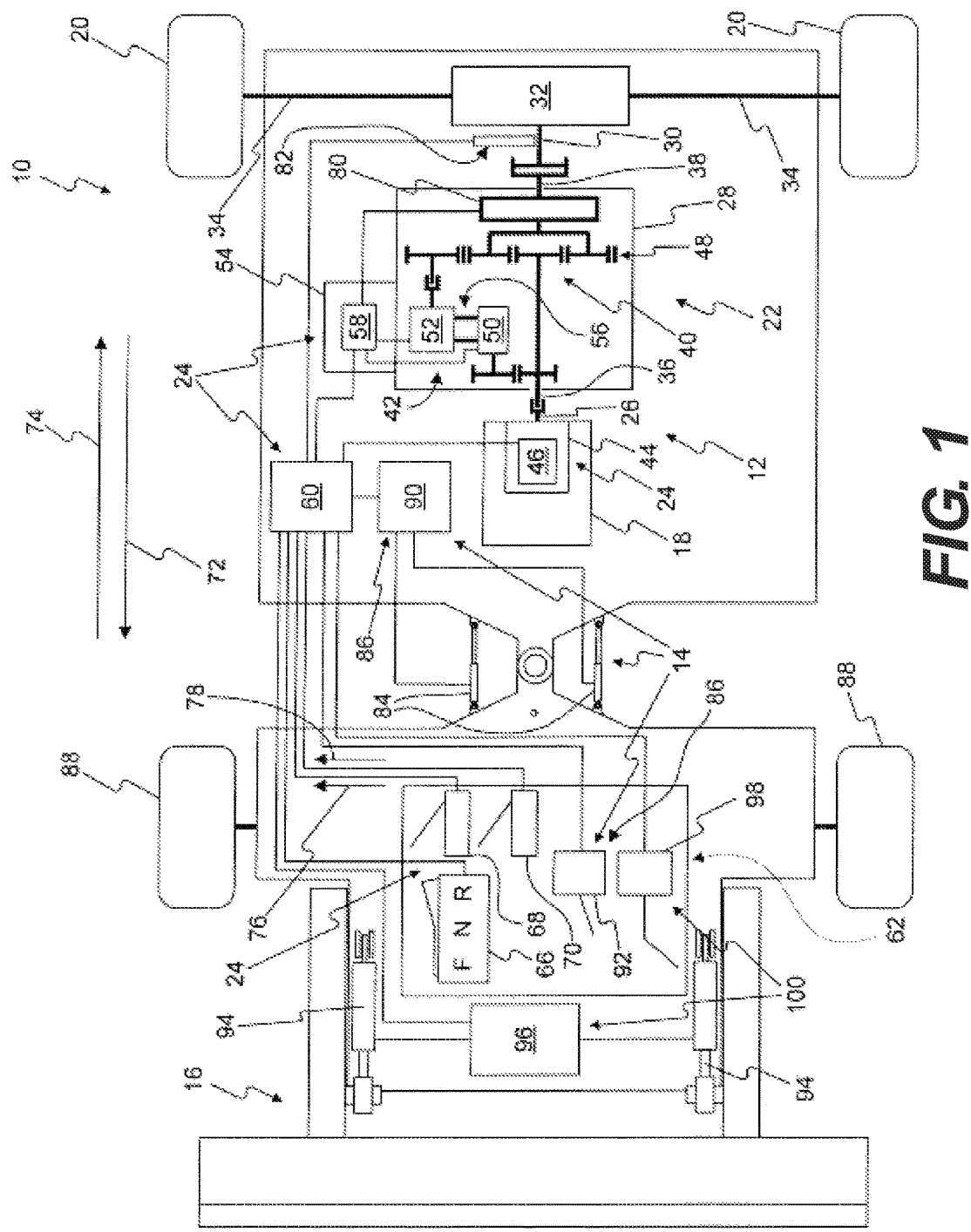
FIG. 1 is a diagrammatic illustration of an exemplary disclosed machine.

FIG. 1 illustrates an exemplary mobile machine 10 having one embodiment of a propulsion control system 12 according to the present disclosure. In addition to propulsion control system 12, mobile machine 10 may have various other systems, including, but not limited to, a steering system 14 and an implement 16.

Propulsion control system 12 may include a power source 18, traction devices 20, a drive train 22, and propulsion system controls 24. Power source 18 may be any type of component operable to provide power for propelling mobile machine 10. For example, power source 18 may be a diesel engine, a gasoline engine, a gaseous-fuel-driven engine, or a turbine engine. Power source 18 may have a rotary output member 26 for supplying rotary mechanical power. Power source 18 may also include power source controls 44. Power source controls 44 may include any component or components operable to control one or more aspects of the operation of power source 18. In some embodiments, power source controls 44 may include a power source controller 46 operatively connected to various sensors and/or actuators (not shown) for monitoring and controlling power source 18. Power source controller 46 may include one or more processors (not shown) and one or more memory devices (not shown).

Traction devices 20 may include any type of components operable to propel mobile machine 10 by receiving power from one or more other components of propulsion control system 12 and apply that power to the environment surrounding mobile machine 10. For example, as shown in FIG. 1, traction devices 20 may include wheels. Traction devices 20 may also include various other types of devices in addition to, or in place of, wheels, including, but not limited to, track units and/or propellers.

Drive train 22 may include any component or components operable to transfer power from power source 18 to traction devices 20 to propel mobile machine 10. For example, drive train 22 may include a continuously variable transmission (CVT) 28, a drive shaft 30, a differential unit 32, and axle shafts 34 connected between power source 18 and traction devices 20. Continuously variable transmission 28 may have a rotary input member 36 and a rotary output member 38. Rotary input member 36 may connect directly or indirectly to rotary output member 26 of power source 18. Drive shaft 30, differential unit 32, and axle shafts 34 may connect rotary output member 38 to traction devices 20.

Continuously variable transmission 28 may have any configuration that allows transferring power between rotary input member 36 and rotary output member 38 while varying the ratio of the speed of rotary input member 36 to the speed of rotary output member 38 through a continuous range. In some embodiments, continuously variable transmission 28 may have an electrical power-transfer path connected between rotary input member 36 and rotary output member 38. The electrical power-transfer path may include a generator and an electric motor. In other embodiments, continuously variable transmission 28 may have a mechanical power-transfer path 40 and a hydraulic power-transfer path 42 connected in parallel between rotary input member 36 and rotary output member 38. Mechanical power-transfer path 40 may include a planetary gear set 48 connected between rotary input member 36 and rotary output member 38. Rotary input member 36 may, for example, connect directly or indirectly to the sun gear of planetary gear set 48, and the planet carrier of planetary gear set 48 may connect directly or indirectly to rotary output member 38.

Hydraulic power-transfer path 42 may include a hydraulic pump 50, a hydraulic motor 52, and a fluid-transfer system 56 for delivering hydraulic fluid pumped by hydraulic pump 50 to hydraulic motor 52. Fluid-transfer system 56 may include various conduits, valves, servomechanisms, reservoirs, and/or other known hydraulics components. Hydraulic pump 50 may connect to rotary input member 36. Hydraulic motor 52 may, for example, connect to the ring gear of planetary gear set 48. This connection of rotary input member 36, hydraulic motor 52, and rotary output member 38 to planetary gear set 48 makes the speed of rotary input member 36, the speed of hydraulic motor 52, and the speed of rotary output member 38 interdependent.

Continuously variable transmission 28 may also include a reverser mechanism 80 connected between planetary gear set 48 and rotary output member 38. Reverser mechanism 80 may have one operating state that results in rotary output member 38 rotating in the same direction as rotary input member 36, and reverser mechanism 80 may have another operating state that results in rotary output member 38 rotating in a direction opposite rotary input member 36. Thus, one operating state of reverser mechanism 80 may allow propulsion of mobile machine 10 in a forward direction 72, and another operating state of reverser mechanism 80 may allow propulsion of mobile machine 10 in a reverse direction 74. Reverser mechanism 80 may have various combinations of power-transfer components, including, but not limited to, gears, pulleys, sprockets, chains, and/or clutches arranged in various manners.

Continuously variable transmission 28 may also include transmission controls 54. Transmission controls 54 may include any component or components operable to control one or more parameters of the operation of continuously variable transmission 28. Transmission controls 54 may, for example, include a transmission controller 58 operatively connected to various components of continuously variable transmission 28. Transmission controller 58 may include one or more processors (not shown) and one or more memory devices (not shown). Transmission controller 58 may be operatively connected to one or more components of hydraulic power-transfer path 42 in a manner enabling transmission controller 58 to control the speed and power output of hydraulic motor 52. Transmission controller 58 may, for example, be operatively connected to hydraulic pump 50 and hydraulic motor 52 in a manner enabling transmission controller 58 to control the displacement of hydraulic pump 50 and the displacement of hydraulic motor 52. By controlling the operating speed and power output of hydraulic motor 52, transmission controller 58 may control the ratio of the speed of rotary input member 36 to the speed of rotary output member 38, as well as the speed and torque output of rotary output member 38. Transmission controller 58 may also be operatively connected to reverser mechanism 80, such that transmission controller 58 may control whether rotary output member 38 rotates in the same direction as, or opposite to, rotary input member 36.

Propulsion system controls 24 may include power source controls 44, transmission controls 54, a master controller 60, and one or more operator-input devices of an operator interface 62 of mobile machine 10. Master controller 60 may include one or more processors and one or more memory devices. Master controller 60 may receive information from various sources. In some embodiments, master controller 60 may incorporate all or some aspects of transmission controller 58 and power source controller 46.

In some embodiments, master controller 60 may receive input from the operator-input devices of propulsion system controls 24. These operator-input devices may include, for example, a FORWARD/NEUTRAL/REVERSE selector 66, an accelerator pedal 68, and a decelerator/brake pedal 70. An operator of mobile machine 10 may select the "FORWARD" operating state of FORWARD/NEUTRAL/REVERSE selector 66 to request propulsion of mobile machine 10 in forward direction 72. Conversely, the operator may select the "REVERSE" operating state of FORWARD/NEUTRAL/REVERSE selector 66 to request propulsion of mobile machine 10 in reverse direction 74. Alternatively, the operator may select the "NEUTRAL" operating state of FORWARD/NEUTRAL/REVERSE selector 66 to request that propulsion control system 12 not propel mobile machine 10 in either forward direction 72 or reverse direction 74.

With the FORWARD/NEUTRAL/REVERSE selector 66 in its FORWARD or REVERSE operating state, accelerator pedal 68 and decelerator/brake pedal 70 may allow the operator to indicate how rapidly he desires propulsion control system 12 to propel mobile machine 10 in the chosen direction. Accelerator pedal 68 may generate a signal 76 indicating how far the operator has depressed it from its default position. Similarly, decelerator/brake pedal 70 may generate a signal 78 indicating how far the operator has depressed it from its default position. Generally, master controller 60 may interpret increased depression of accelerator pedal 68 as a request for increased speed in the chosen direction and increased depression of decelerator/brake pedal 70 as a request for decreased speed in the chosen direction. In some embodiments, master controller 60 may consider signals 76, 78 collectively as the indication of the propulsion speed desired by the operator. In such embodiments, master controller 60 may consider any depression of decelerator/brake pedal 70 as at least partially offsetting any depression of accelerator pedal 68 and vice versa, with the relationship between signals 76, 78 defining the desired propulsion speed.

In addition to operator-input devices, various other components and/or systems may provide information to master controller 60. For example, a speed/direction sensor 82 may provide master controller 60 a signal indicating the travel speed of mobile machine 10, as well as whether mobile machine 10 is traveling in forward direction 72 or in reverse direction 74. Master controller 60 may also receive signals from various other sensors (not shown), including, but not limited to, other speed/direction sensors, torque and/or load sensors configured for generating signals indicative of torque and/or load at outputs of the power source and the CVT, position sensors, hydraulic pressure sensors, GPS location sensors, terrain slope sensors, implement position sensors, and/or temperature sensors.

Master controller 60 may also be operatively connected to power source controls 44 and transmission controls 54. For example, master controller 60 may be communicatively linked to power source controller 46 of power source controls 44, as well as to transmission controller 58 of transmission controls 54. This may allow master controller 60 to coordinate control of power source 18 and continuously variable transmission 28 by receiving information from and sending control commands to power source controller 46 and transmission controller 58.

Propulsion control system 12 is not limited to the configuration shown in FIG. 1. For example, continuously variable transmission 28 may have a different configuration. Continuously variable transmission 28 may include components not shown in FIG. 1, and/or continuously variable transmission 28 may omit one or more of the components shown in FIG. 1. In some embodiments, continuously variable transmission 28 may include provisions for discrete changes in the drive ratio within various portions of mechanical power-transfer path 40 and/or in other portions of continuously variable transmission 28. Additionally, in some embodiments, in place of hydraulic power-transfer path 42, continuously variable transmission 28 may have an electrical power-transfer path parallel with mechanical power-transfer path 40. Such an embodiment of an electric variable transmission 28 may include an electric generator, an electric motor, and an electrical power-transfer circuit in place of hydraulic pump 50, hydraulic motor 52, and fluid-transfer system 56, respectively. The electric generator and/or electric motor may be a switched reluctance motor (SRM), or other synchronous or asynchronous type of motor. A SRM motor produces torque that is proportional to the square of the amount of current flowing through windings on a stator of the motor. Electronic controls switch current on and off through successive stator windings in order to control the speed of rotation of a rotor. A rotor position transducer is provided to detect the position of the rotor, which is used by the electronic controls in determining when the current should be switched on and off through the successive stator windings to generate a selected amount of torque at the rotor.

Additionally, in some embodiments, continuously variable transmission 28 may not have parallel power-transfer paths. For example, continuously variable transmission 28 may have a single mechanical power-transfer path. Alternatively, continuously variable transmission 28 may be a conventional hydrostatic transmission. Similarly, continuously variable transmission 28 may include only an electrical power-transfer path that includes an electric generator connected directly or indirectly to rotary input member 36 and an electric motor such as a SRM connected directly or indirectly to rotary output member 38.

Drive train 22 may also have continuously variable transmission 28 connected between rotary output member 26 of power source 18 and traction devices 20 differently than shown in FIG. 1. For example, drive train 22 may include various additional components connected between rotary input member 36 of continuously variable transmission 28 and rotary output member 26 of power source 18, including, but not limited to, one or more clutches, fluid couplers, gears, pulleys, belts, sprockets, and chains. Similarly, drive train 22 may have additional power-transfer components connected between rotary output member 38 of continuously variable transmission 28 and traction devices 20, and/or drive train 22 may omit one or more of drive shaft 30, differential unit 32, and axle shafts 34.

Additionally, propulsion system controls 24 may have a different configuration. For example, in combination with, or in place of, FORWARD/NEUTRAL/REVERSE selector 66, accelerator pedal 68, and decelerator/brake pedal 70, propulsion system controls 24 may include various other operator-input devices with which an operator may indicate one or more aspects of how the operator desires propulsion control system 12 to propel mobile machine 10. Additionally, propulsion system controls 24 may omit one or more of power source controller 46, transmission controller 58, and master controller 60. Furthermore, propulsion system controls 24 may include various other types of control components, such as hardwired control circuits, in addition to, or in place of, one or more of power source controller 46, transmission controller 58, and master controller 60.

Steering system 14 may include any component or components operable to control whether, in what direction, and how sharply mobile machine 10 turns while traveling in forward direction 72 or reverse direction 74. For example, steering system 14 may include steering actuators 84 and steering-system controls 86. Under the control of steering-system controls 86, steering actuators 84 may interact with other components of mobile machine 10 in various manners to control whether, in what direction, and how sharply mobile machine 10 turns. In some embodiments, steering actuators 84 may control the direction of front wheels 88 of mobile machine 10 relative to traction devices 20.

Steering-system controls 86 may, for example, include actuator controls 90, a steering-input device 92 of operator interface 62, and master controller 60. Actuator controls 90 may include any component or components operable to control the operation of steering actuators 84. Steering-input device 92 may include any component or components that an operator may use to indicate how the operator wishes to steer mobile machine 10. For example, steering-input device 92 may include a joystick. Master controller 60 may be operatively connected to steering-input device 92 and actuator controls 90. Accordingly, master controller 60 may indirectly control steering actuators 84 based on information from steering-input device 92.

Steering system 14 is not limited to the configuration shown in FIG. 1. Steering system 14 may employ an approach other than controlling the direction of front wheels 88 to turn mobile machine 10. For example, steering system 14 may steer mobile machine 10 in a skid-steer manner. Additionally, steering system 14 may have steering-input device 92 connected directly to actuator controls 90, rather than having master controller 60 control actuator controls 90 based on information from steering-input device 92. Furthermore, in some embodiments, steering system 14 may omit steering actuators 84 and actuator controls 90, requiring the operator to provide the force to steer mobile machine 10.

Implement 16 may be any type of device configured to perform one or more tasks other than propelling mobile machine 10. For example, as shown in FIG. 1, implement 16 may be a blade of a bulldozer. Implement 16 may include one or more actuators 94 that power it, and mobile machine 10 may include implement controls 96 for controlling actuators 94 to control implement 16. Implement controls 96 may include an implement-input device 98 of operator interface 62, actuator controls 100, and master controller 60. Implement-input device 98 may include any component or components that an operator can use to indicate how the operator wants to operate implement 16, including, but not limited to, one or more handles, pedals, and/or buttons. Actuator controls 100 may include any component or components operable to control actuators 94. Master controller 60 may be operatively connected to implement-input device 98 and actuator controls 100, so that master controller 60 may control actuators 94 through actuator controls 100 in order to operate implement 16 in accordance with input from implement-input device 98.

Implement 16 and implement controls 96 are not limited to the configuration shown in FIG. 1. Implement 16 may be, for example, a type of implement other than a bulldozer blade, such as an excavating tool, a hoist, a demolition tool, or the like. Implement controls 96 may have implement-input device 98 connected directly to actuator controls 100, rather than employing master controller 60 to control actuator controls 100 based on information from implement-input device 98. Additionally, implement controls 96 may include other implement-input devices (not shown) in addition to implement-input device 98.

Mobile machine 10 is not limited to the configuration shown in FIG. 1. For example, mobile machine 10 may have propulsion control system 12, steering system 14, and implement 16 arranged in different manners. Mobile machine 10 may also include various systems not shown in FIG. 1. In some embodiments, mobile machine 10 may include other implements in addition to implement 16. Alternatively, mobile machine 10 may omit implement 16. Similarly, mobile machine 10 may omit steering system 14.

Figure 4:
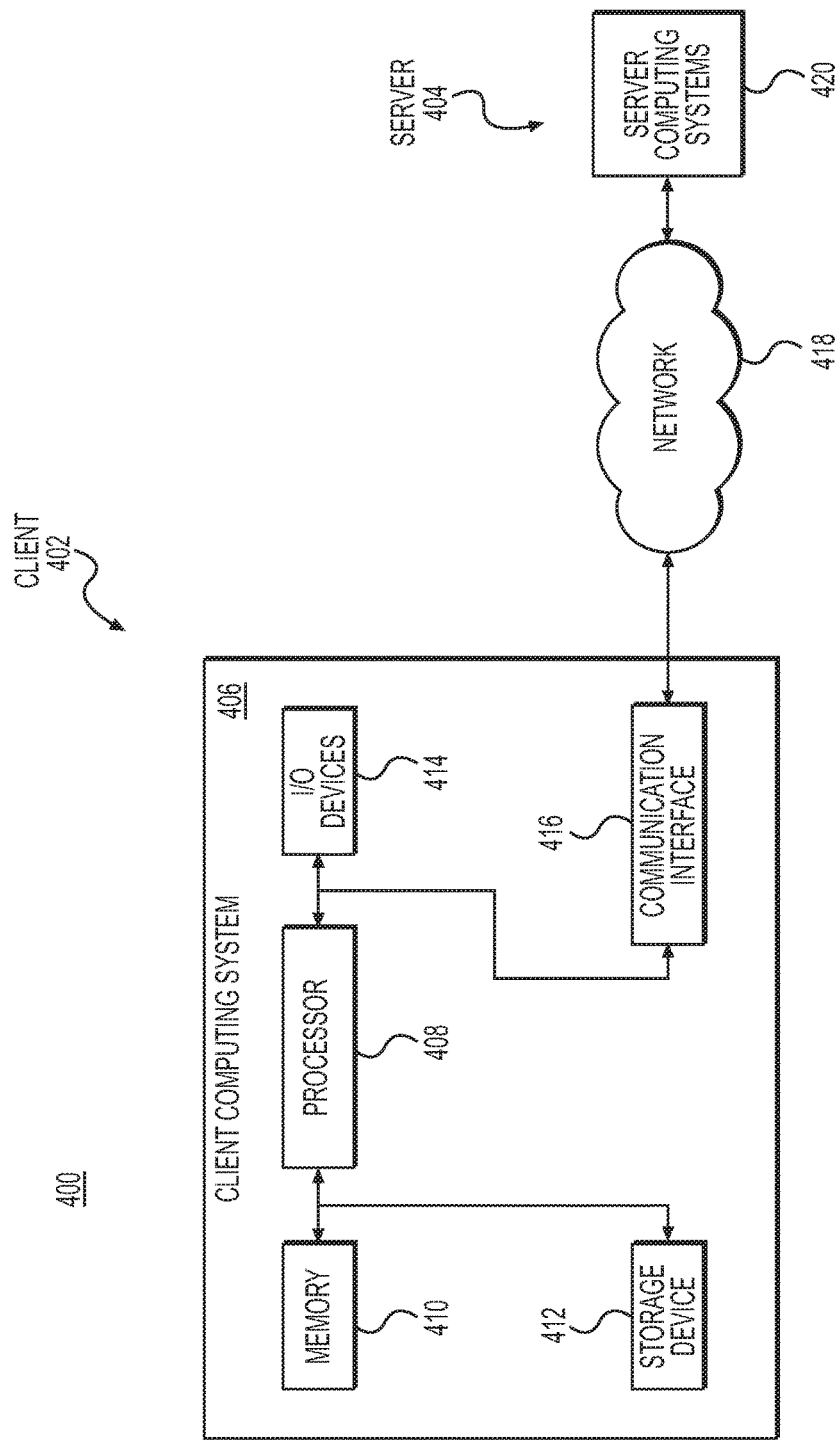
FIG. 4 is a diagrammatic illustration of an exemplary client/server computing system that may include the exemplary propulsion control system of FIG. 3.

Master controller 60 may embody a single microprocessor or multiple microprocessors that include a means for controlling an operation of machine 10. Numerous commercially available microprocessors may be configured (programmed) to perform the functions of master controller 60, and the functions of any of the other controllers, such as power source controller 46, and transmission controller 58. Master controller 60 may readily embody a general machine microprocessor capable of controlling numerous machine functions, and/or may be part of a separate client computing system, such as illustrated in FIG. 4. Master controller 60 may include a memory, a secondary storage device, a processor, and any other components for running an application. Various other circuits may be associated with controller 60, such as, for example, power supply circuitry, signal conditioning circuitry, data acquisition circuitry, signal output circuitry, signal amplification circuitry, and other types of circuitry known in the art. In an exemplary embodiment shown in FIG. 4, a controller may be incorporated into a client device 402, which may be part of an electronic control module (ECM) on machine 10, or may be a portable device such as a laptop computer, a smart phone, or another type of computing device located on or off of the machine. Client device 402 may include one or more processors 408, a memory 410, a secondary storage device 412, a plurality of input/output devices 414, and a communication interface 416. Client device 402 may be configured to communicate over a network 418 using communication interface 416 with other client devices and/or with a server 404 and one or more server computing systems 420 located offboard the machine, such as at a central command control center.

Controller 60 may include one or more sources of data stored within an internal memory of controller 60. In an exemplary embodiment according to this disclosure controller 60 may include data in the form of maps or other data sources such as a lookup table, a database, a spreadsheet, a system of equations, etc. Each of a plurality of maps may include a collection of data in the form of tables, graphs, and/or equations. Controller 60 may include at least one map usable for controlling a power source speed limit (i.e., maximum speed of the power source rotational output) as a function of the CVT output speed and/or machine ground speed (CVT output speed and machine ground speed may both be measurable or calculable using the signal received from speed/direction sensor 82, and CVT output speed may be readily converted to machine ground speed, or vice versa). The actual (or current) power source speed may be below, but not above the power source speed limit. A map included in memory of controller 60 may specify the power source speed limit for a plurality of speed modes, such as, for example, a low-speed mode, a mid-speed mode, and a high-speed mode. The speed modes may be directly related to machine ground speed and/or CVT output speed. When using, for example, a low-speed mode or a mid-speed mode, controller 60 may allow modulation of the actual power source speed up to, but not exceeding the power source speed limit. In at least one speed mode, such as, for example, a high-speed mode, controller 60 may control the actual power source speed (or power source speed command) based on the CVT output speed. For example, controller 60 may give an engine speed command to force an actual power source speed to the power source speed limit (operator no longer directly controls the actual power source speed with an operator input device). Thus, in a high-speed mode, an operator input device may control an output torque of the CVT. Each speed range may be optimized to maximize the efficiency and responsiveness of machine 10.

Figure 3:
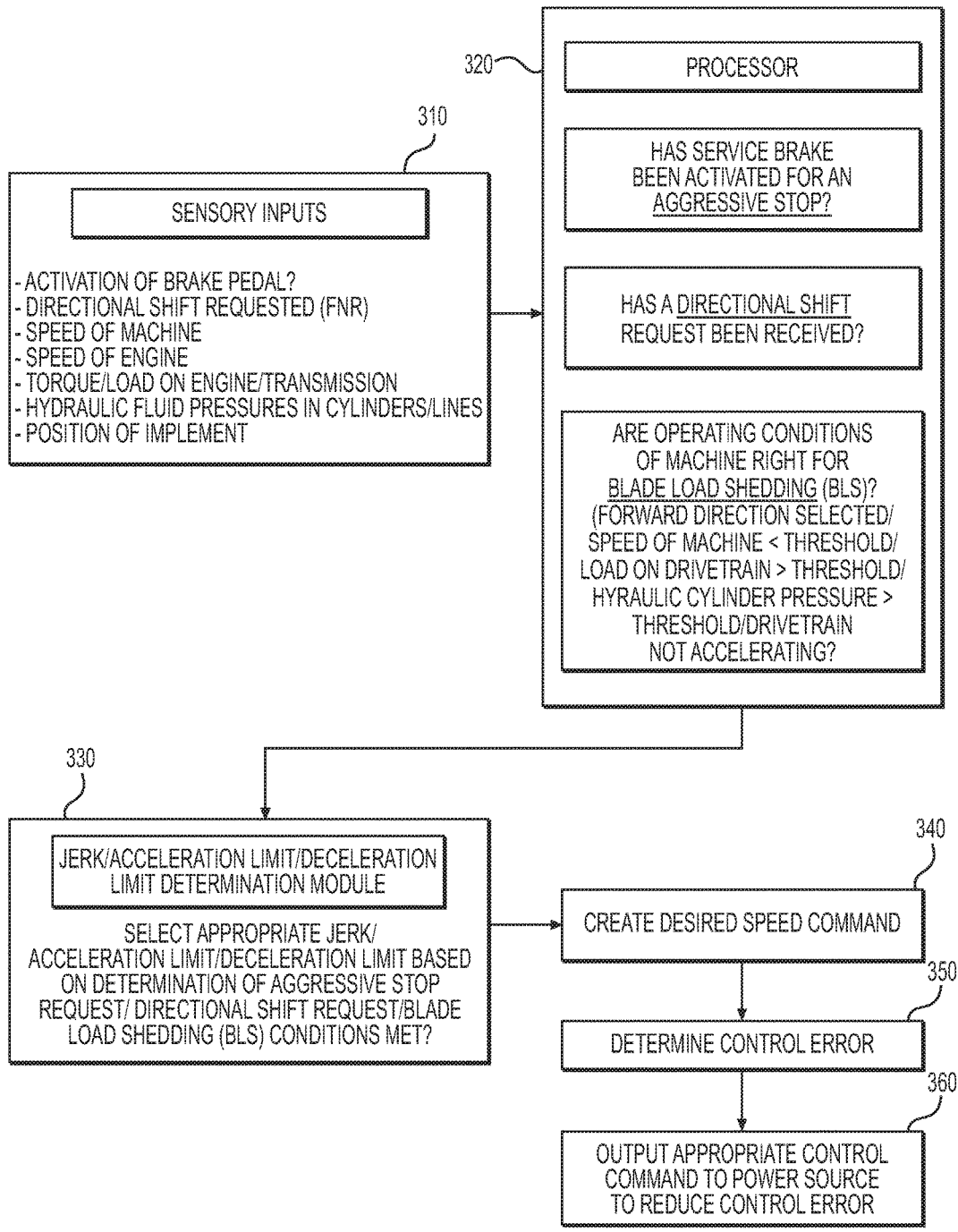
FIG. 3 is a diagrammatic illustration of an exemplary disclosed propulsion control system for implementing the process illustrated in FIG. 2.

As shown in the exemplary implementation of FIG. 3, a processor 320 of controller 60 may be configured to determine a desired speed command and actual, real-time operating conditions of machine 10 by receiving various sensory inputs from sensors operatively associated with components, subsystems, and systems of machine 10, and input/output commands from an operator. Processor 320 may determine, for example, whether a service brake has been activated for an aggressive stop, whether a directional shift request has been received, and whether operating conditions of the machine are right for a potential blade load shedding (BLS) operation (also referred to herein as an implement load shedding operation). A BLS operation (or implement load shedding operation) coincides with a situation where an operator may wish to control the machine such that soil or other material that is potentially clinging to a blade or other implement of the machine is shed from the blade or implement as a result of aggressive movements of machine 10 and/or implement 16. Examples of the types of operating conditions where an operator may wish to perform BLS may include an indication that a forward direction has been selected, a speed of the machine is less than a threshold speed, a load on the drivetrain of the machine is greater than a threshold load, a hydraulic cylinder pressure in a hydraulic cylinder connected to the blade or other implement of the machine is greater than a threshold pressure, and the machine is not accelerating. All or some of the above-listed operating conditions and other potential operating conditions may have been determined historically and/or empirically to be indicative of conditions when a potential BLS operation may be desired. The BLS operating conditions may be characteristic of conditions, for example, when a bulldozer is actually performing a dozing operation, and therefore may encounter conditions when material is sticking to the blade. The exact values for threshold speeds, threshold loads, threshold pressures, and other operating conditions may be stored in a memory associated with processor 320, and may be correlated with particular machines, particular environments in which a machine is operating, and other factors. In some embodiments processor 320 of controller 60 may also be programmed to select jerk values (rate of change of acceleration) and deceleration limit values that have higher limits at lower machine speeds, and jerk values and deceleration limit values that have lower limits at higher machine speeds.

A jerk/acceleration/deceleration module 330 may be associated with, operatively connected to, or an integral part of processor 320, and may be configured and programmed to select appropriate jerk, acceleration, and deceleration limit values for machine 10 based on the determination of whether a service brake has been activated for an aggressive stop, whether a directional shift request has been received, and whether operating conditions of the machine are right for a potential blade load shedding (BLS) operation. The selection of an appropriate jerk/acceleration/deceleration limit value enables the propulsion control system according to various embodiments of this disclosure to balance the aggressiveness of response of machine 10 under different operating conditions. For example, in one operational situation, an operator may be activating a speed pedal only part way in an effort to perform fine speed modulation of machine 10. In this operational situation the operator may not want to experience any aggressive changes to acceleration or deceleration of the machine since the operator is attempting to finely control speed, for example, to maneuver around an obstacle.

In another operational situation where an operator may wish to experience a more aggressive response from the machine, the operator may have elected to perform a directional shift, such as shifting from forward to reverse when operating a bulldozer to push material over a cliff or a drop-off in the terrain being bulldozed. In this directional shift scenario, the operator may expect an aggressive response so that there is no concern with the machine continuing forward after having been shifted into reverse. Therefore, jerk values and acceleration/deceleration limit values associated with a directional shift request may be higher than normal jerk values and acceleration/deceleration values when the machine is not performing a dozing operation.

In still another operational situation, the machine may be performing a dozing operation, and the conditions may be characteristic of conditions when large amounts of material may be clinging to the blade of machine 10. In this operational situation, an operator may want to maneuver machine 10 aggressively such that the material clinging to the blade will be shed from the blade. Therefore, a BLS operation may call for jerk values and acceleration/deceleration limit values that are even higher than the jerk values and acceleration/deceleration limit values selected for a directional shift operation.

In yet another operational situation, an operator may operate a brake pedal in an aggressive manner, such as by pushing the brake pedal beyond a threshold amount of pedal activation, or by pushing the brake pedal at a speed faster than a threshold value for speed of activation, expecting machine 10 to respond immediately. The propulsion control system according to various implementations of this disclosure avoids a situation where the CVT does not shift downward fast enough in a braking situation, and therefore actually fights the brakes being applied by the operator. To avoid any situation where the CVT fights the brakes, jerk values and deceleration limit values selected for a braking operation may be higher than the jerk values and deceleration limit values selected for a BLS operation or jerk values selected for a directional shift operation.

After jerk/acceleration/deceleration determination module 330 determines an appropriate jerk value for the particular operator inputs and machine operational conditions, the selected jerk value may be integrated twice (while applying acceleration or deceleration limits) in order to create a smooth speed command 340 with the desired on-coming jerk, acceleration/deceleration limits, and off-going jerk. The shape of the speed command 340 may be constantly or periodically adjusted as operating conditions sensed by sensory inputs 310 change. A determination of a control error 350, or difference between an actual speed of machine 10 and a desired speed command 340 may be determined, for example by a proportional-integral-derivative (PID) controller, and a control command 360 may be output to at least one of power source controller 46 and transmission controller 58. Control command 360 may result in a change to the output torque of power source 18 and/or CVT 28, as required in order to match the real-time behavior of machine 10 with an expected behavior under different operating conditions and operator selected input commands.

INDUSTRIAL APPLICABILITY

The disclosed propulsion control system may be applicable to any machine where variations in the aggressiveness of response of the machine under different operating conditions and operator inputs are expected and desired. Propulsion control system 12 may have application for propelling any mobile machine 10. Power source 18 may provide power to propel mobile machine 10 by rotating rotary input member 36 of continuously variable transmission 28 with rotary output member 26 of power source 18. Continuously variable transmission 28 may transfer at least a portion of this power from rotary input member 36 to rotary output member 38. Traction devices 20 may receive the power output by rotary output member 38 and apply that power to the environment around mobile machine 10, thereby propelling mobile machine 10.

While propulsion control system 12 propels mobile machine 10 in this manner, master controller 60 and propulsion system controls 24 may control the direction and magnitude of acceleration of mobile machine 10, as well as the jerk of mobile machine 10 (the rate of change of the acceleration). Control of the jerk of machine 10 may include separately controlling on-coming jerk, acceleration or deceleration limits, and off-going jerk. To do so, propulsion system controls 24 may control various operating parameters of propulsion control system 12, including, but not limited to, one or more operating parameters of power source 18 and/or one or more operating parameters of continuously variable transmission 28. For example, propulsion system controls 24 may control how much power rotary output member 38 of continuously variable transmission 28 outputs by adjusting the operation of continuously variable transmission 28 and/or power source 18 to control the speed and torque output of rotary output member 38.

Generally, propulsion system controls 24 may control the power that rotary output member 38 provides (and thus the acceleration, deceleration, and jerk of mobile machine 10) in accordance with operator inputs. For example, when the operator requests an increase or decrease in speed, propulsion system controls 24 may adjust the torque output of rotary output member 38 by an amount based on the magnitude of the requested speed increase or decrease. Selected jerk levels under different operating conditions may also have different limits depending on the speed of machine 10. For example, jerk levels may be subjected to lower limits when the speed of machine 10 is higher than when the speed of machine 10 is lower. This may prevent rapid changes in acceleration that would be unexpected and undesirable to an operator of machine 10 when machine 10 is traveling at higher rates of speed. These same limits to jerk values may, however, be removed in certain situations such as when an operator aggressively activates a brake pedal, expecting an immediate deceleration.

When mobile machine 10 is traveling in forward direction 72 or reverse direction 74 and the operator manipulates FORWARD/NEUTRAL/REVERSE selector 66 to request propulsion in the opposite direction, propulsion system controls 24 may change the output torque provided by rotary output member 38. In such circumstances, propulsion system controls 24 may, for example, adjust the operation of continuously variable transmission 28 and/or power source 18 to change the direction of the torque output by rotary output member 38 to first decelerate mobile machine 10 to a stop and then accelerate mobile machine 10 in the newly requested forward direction 72 or reverse direction 74. When changing the direction of torque output by rotary output member 38 in response to such an operator-requested directional shift, propulsion system controls 24 may control the magnitude of the output torque based at least in part on the signals 76, 78 from accelerator pedal 68 and decelerator/brake pedal 70. In addition or alternatively to controlling torque output by rotary output member 38, master controller 60 may directly control actuator controls 90 and/or implement controls 96 to directly affect steering of machine 10 and/or position of implement 16 to further enable machine behaviors expected or desired by an operator.

Propulsion system controls 24 may, however, impose a limit on adjustment of the continuously variable transmission 28 and/or power source 18 in response to operator requests for acceleration, deceleration, and directional shifts. By imposing such a limit, propulsion system controls 24 may avoid excessive levels of acceleration and jerk in certain operational situations, and select higher levels of jerk/acceleration/deceleration limits in other operational situations, such as an aggressive braking situation, a directional shift situation, and a blade load shedding (BLS) situation. Propulsion system controls 24 may control jerk levels as discussed above by implementing output control commands to adjust torque output from power source 18 and/or CVT 28 in a manner that controls the acceleration and/or jerk of mobile machine 10 differently in some circumstances than in other circumstances. By doing so, propulsion system controls 24 may allow relatively high levels of acceleration and jerk in circumstances where the operator expects and desires aggressive response from propulsion control system 12, while limiting acceleration and jerk to lower values in circumstances where the operator does not expect or desire such aggressive operation.

Figure 2:
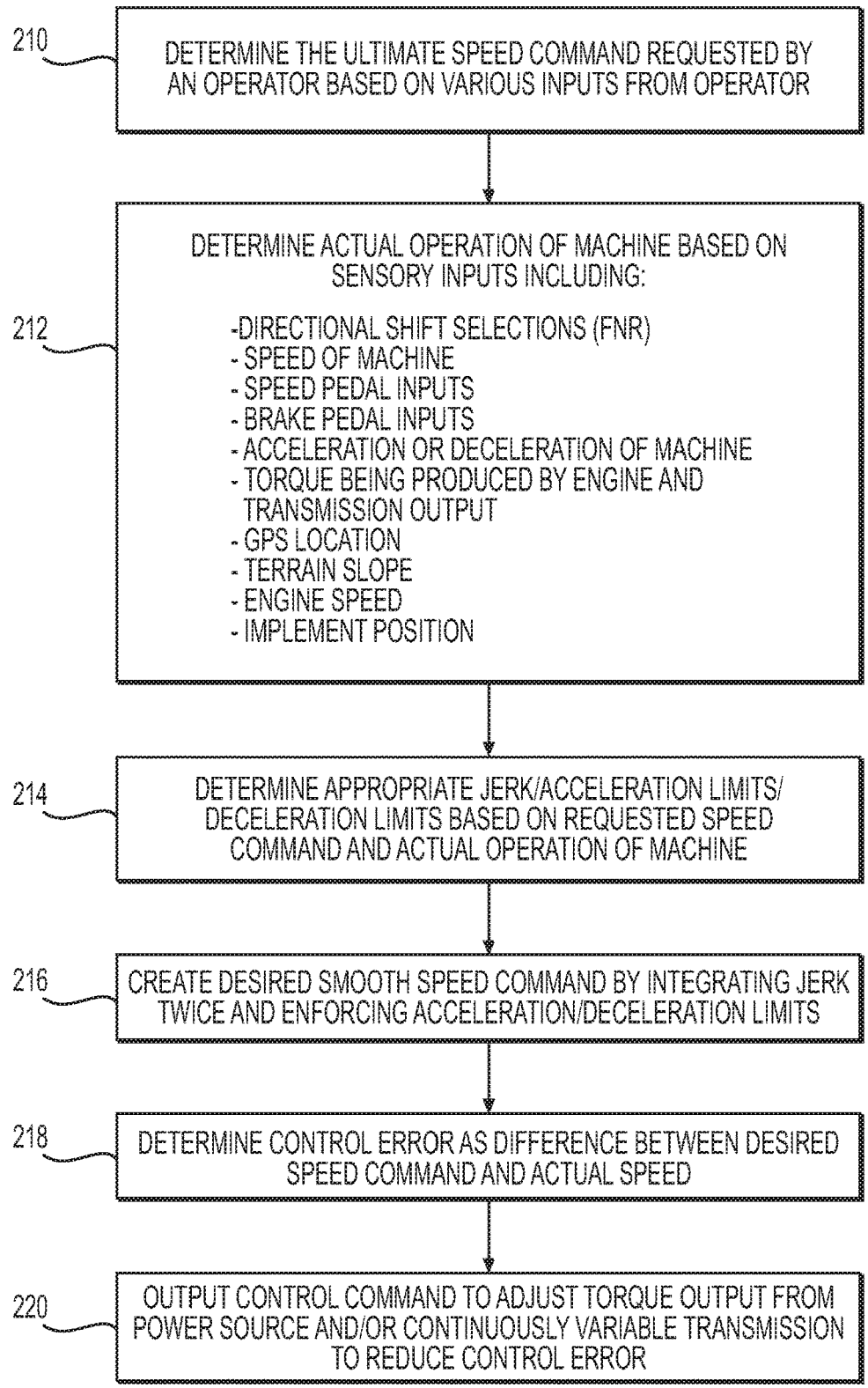
FIG. 2 is a flow chart used to determine jerk values, integrate the jerk values into commanded acceleration and velocity, and output control commands to adjust powertrain output.

As discussed above, processor 320 and propulsion system controls 24 may employ various methods to limit acceleration and/or jerk of mobile machine 10 differently in some circumstances than in other circumstances. FIG. 2 illustrates one embodiment of a control method that may be implemented by processor 320 and propulsion system controls 24 for this purpose. In the exemplary method of FIG. 2, propulsion system controls 24 may continually monitor for changes in operator inputs related to propulsion and determine the ultimate speed command requested by an operator based on various inputs received from the operator (step 210). Processor 320 may determine actual operation of machine 10 based on various sensory inputs, including, but not limited to directional shift selections (FNR), speed of machine 10, speed pedal inputs, brake pedal inputs, actual acceleration or deceleration of machine 10, torque being produced by power source 18 and/or CVT 28, a GPS location of machine 10, a terrain slope for ground on which machine 10 is operating, a rotational speed of power source 18, and a position of implement 16 (step 212).

Processor 320 may determine an appropriate jerk/acceleration/deceleration limit value based on the requested speed command and the determined operation of machine 10 (step 214) (while applying acceleration or deceleration limits). Next, processor 320 may create a desired smooth speed command by integrating the jerk value twice (step 216). The control error as exhibited by a difference between the desired speed command and the actual speed of machine 10 may then be determined (step 218). In various exemplary implementations of this disclosure, the control error determined in step 218 may be calculated by a proportional-integral-derivative (PID) controller. Finally, based on the determined control error, an output control command may be produced by processor 320 (which may be part of master controller 60), and sent to one or more of power source controller 46 and transmission controller 58. In the case of an electric CVT including a switched reluctance motor (SRM), transmission controller 58 may control the amount of current and shape of the current in the stator windings to affect the speed of rotation and torque output of the electric CVT for an amount of current generated by a generator operatively coupled with the SRM. In a SRM the speed of rotation of the rotor is determined by the switching speed of the stator poles, which may be controlled, for example, by insulated gate bipolar transistors (IGBT's), and the torque output is proportional to the square of the current flowing in the stator windings.

When propulsion system controls 24 detect a change in operator inputs related to propulsion, propulsion system controls 24 may determine a target adjustment for an operating parameter of continuously variable transmission 28 based on the change in the operator inputs (step 210). For example, propulsion system controls 24 may determine a target adjustment for a parameter of the power output by rotary output member 38 in response to changed operator inputs relating to propulsion. In some embodiments, propulsion system controls 24 may determine a target adjustment in the torque output of rotary output member 38 in response to an operator request for increased acceleration, increased deceleration, aggressive braking, and/or a directional shift.

Simultaneously, processor 320 of master controller 60 according to various implementations of this disclosure may determine appropriate jerk values to be implemented by power source 18 and CVT 28 based on one or more operating conditions as represented by various sensory inputs (step 212). After determining appropriate jerk/acceleration/deceleration limit values, processor 320 of master controller 60 may create a desired smooth speed command (step 216), determine any control error between the desired smooth speed command and the actual speed of machine 10 (step 218), and output an appropriate control command to adjust torque output from power source 18 and/or CVT 28 to reduce the control error. By controlling the torque output of rotary output member 38 or some other parameter of the power output by rotary output member 38, processor 320 and propulsion system controls 24 may control the acceleration and/or jerk of mobile machine 10 based on the one or more operating conditions used to determine the appropriate jerk values.

Methods that the propulsion control system according to various embodiments of this disclosure may use to control the jerk of mobile machine 10 differently in different circumstances are not limited to the examples discussed above. For example, processor 320 of master controller 60 may implement different relationships between the selected jerk levels and the operating conditions used to determine the selected jerk levels. Additionally, the propulsion control system and processor 320 may adjust jerk of mobile machine 10 by adjusting an operating parameter of CVT 28 other than the torque output by rotary output member 38. Furthermore, in determining and correcting for control error between a desired speed command and an actual speed of machine 10, processor 320 may perform the actions shown in the flow chart of FIG. 2 in different orders and/or perform other actions in addition to, or in place of, the actions shown in FIG. 2.

It will be apparent to those skilled in the art that various modifications and variations can be made to the disclosed propulsion control system without departing from the scope of the disclosure. Other embodiments of the propulsion control system will be apparent to those skilled in the art from consideration of the specification and practice of the system disclosed herein. For example, any alternative CVT may be used in place of the disclosed CVT's, and all speed ranges may be related to virtual discrete gear ratios. It is intended that the specification and examples be considered as exemplary only, with a true scope being indicated by the following claims and their equivalents.

What is claimed is:

1. A propulsion control system for providing different levels of jerk as a function of operator inputs and actual measured operational parameters in a machine, the system comprising:
   a power source;
   a continuously variable transmission (CVT) coupled to an output of the power source;
   a plurality of input/output devices;
   a plurality of sensors configured to generate signals indicative of operational parameters of the machine; and
   a controller communicatively coupled with the power source, the CVT, the input/output devices, and the sensors, the controller including:
      a database stored in a memory with a plurality of jerk values mapped to different operations of the machine selected from at least one of:
         activation of a brake by an operator for an aggressive stop,
         a directional shift request from an operator to select one of forward, reverse, or neutral, and
         a set of operating conditions of the machine indicative of a blade load shedding mode;
      a jerk selection module programmed to select at least one of a jerk value, an acceleration limit value, and a deceleration limit value based on a current operation of the machine;
      a speed command generating device programmed to integrate a selected jerk value twice to generate a desired speed command;
      a proportional-integral-derivative (PID) control device configured to continuously calculate a control error between the desired speed command and an actual speed of the machine; and
      an output command control module configured to output a control command for implementing a change in an output torque to at least one of the power source and the CVT to reduce the control error.

2. The propulsion control system of claim 1, wherein the database includes jerk values that are higher for a blade load shedding mode than for a directional shift request.

3. The propulsion control system of claim 2, wherein the database includes jerk values that are higher for activation of a brake by an operator for an aggressive stop than for a blade load shedding mode.

4. The propulsion control system of claim 1, wherein the database includes at least one jerk value mapped to a set of operating conditions of the machine indicative of a blade load shedding mode, wherein the set of operating conditions includes at least one of an indication that a forward direction of the machine has been selected, a speed of the machine is less than a threshold speed value, a load on a drivetrain of the machine is greater than a threshold load value, a hydraulic cylinder pressure in a hydraulic cylinder connected to a machine implement is greater than a threshold pressure value, and an indication that the machine is not accelerating.

5. The propulsion control system of claim 4, wherein the database includes jerk values that are higher for a blade load shedding mode than for a directional shift request.

6. The propulsion control system of claim 5, wherein the database includes jerk values that are higher for activation of a brake by an operator for an aggressive stop than for a blade load shedding mode.

7. The propulsion control system of claim 1, wherein the CVT is an electric CVT including a generator and a switched reluctance motor.

8. The propulsion control system of claim 1, wherein the jerk selection module is programmed to include higher limits for jerk values and deceleration values at lower machine speeds, and lower limits for jerk values and deceleration values at higher machine speeds.

9. The propulsion control system of claim 1, wherein the plurality of input/output devices include a speed pedal and a brake pedal, and the plurality of sensors include sensors that detect at least one of a speed of the machine, an acceleration or deceleration of the machine, a rotational speed of the power source, a torque being output by the power source and by the CVT, a hydraulic fluid pressure in a hydraulic cylinder operatively connected to an implement of the machine, a location of the machine, and a slope of terrain on which the machine is operating.

10. A method of machine control, comprising:
    selecting a jerk value from a database stored in a memory including a plurality of jerk values mapped to different operations of the machine including at least one of:
       activation of a brake by an operator for an aggressive stop,
       a directional shift request from an operator to select one of forward, reverse, or neutral, and
       a set of operating conditions of the machine indicative of a blade load shedding mode;
    integrating the selected jerk value twice to generate a desired smooth speed command for the machine;
    continuously calculating a control error between the desired speed command and an actual speed of the machine; and
    outputting a control command for implementing a change in an output torque to at least one of a power source and a continuously variable transmission in a drivetrain of the machine.

11. The method of claim 10, wherein a jerk value selected for a blade load shedding mode is higher than a jerk value selected for a directional shift request.

12. The method of claim 11, wherein a jerk value selected for activation of a brake by an operator for an aggressive stop is higher than a jerk value selected for a blade load shedding mode.

13. The method of claim 10, wherein selecting a jerk value mapped to a set of operating conditions of the machine indicative of a blade load shedding mode includes selecting a jerk value for a set of operating conditions including at least one of an indication that a forward direction of the machine has been selected, a speed of the machine is less than a threshold speed value, a load on a drivetrain of the machine is greater than a threshold load value, a hydraulic cylinder pressure in a hydraulic cylinder connected to a machine implement is greater than a threshold pressure value, and an indication that the machine is not accelerating.

14. The method of claim 13, wherein selecting a jerk value mapped to a set of operating conditions of the machine indicative of a blade load shedding mode includes selecting a jerk value that is higher than for a directional shift request.

15. The method of claim 14, wherein selecting a jerk value mapped to a set of operating conditions of the machine indicative of activation of a brake by an operator for an aggressive stop includes selecting a jerk value that is higher than for a blade load shedding mode.

16. The method of claim 10, further including detecting at least one of a speed of the machine, an acceleration or deceleration of the machine, a rotational speed of the power source, a torque being output by the power source and by the CVT, a hydraulic fluid pressure in a hydraulic cylinder operatively connected to an implement of the machine, a location of the machine, and a slope of terrain on which the machine is operating.

17. The method of claim 10, further including selecting jerk values and deceleration values that have higher limits at lower machine speeds, and selecting jerk values and deceleration values that have lower limits at higher machine speeds.

18. An earthmoving machine, comprising:
a power source;
a traction device;
a CVT operatively coupled to the power source to transmit output of the power source to the traction device;
an implement; and
a propulsion control system for providing different levels of jerk as a function of operator inputs and actual measured operational parameters of the machine, wherein the propulsion control system includes:
a plurality of input/output devices;
a plurality of sensors configured to generate signals indicative of operational parameters of the machine; and
a controller communicatively coupled with the input/output devices, and the sensors, the controller including:
a database stored in a memory with a plurality of jerk values mapped to different operations of the machine selected from at least one of:
activation of a brake by an operator for an aggressive stop,
a directional shift request from an operator to select one of forward, reverse, or neutral, and
a set of operating conditions of the machine indicative of an implement load shedding mode;
a jerk selection module programmed to select at least one of a jerk value, an acceleration limit value, and a deceleration limit value based at least in part on a current operation of the machine;
a speed command generating device programmed to integrate a selected jerk value twice to generate a desired speed command;
a control device configured to continuously calculate a control error between the desired speed command and an actual speed of the machine; and
an output command control module configured to output a control command for implementing a change in an output torque to at least one of the power source and the CVT to reduce the control error.

19. The machine of claim 18, wherein the database includes jerk values that are higher for an implement load shedding mode than for a directional shift request, and jerk values that are higher for activation of a brake by an operator for an aggressive stop than for an implement load shedding mode.

20. The machine of claim 18, wherein the database includes at least one jerk value mapped to a set of operating conditions of the machine indicative of an implement load shedding mode, wherein the set of operating conditions includes at least one of an indication that a forward direction of the machine has been selected, a speed of the machine is less than a threshold speed value, a load on a drivetrain of the machine is greater than a threshold load value, a hydraulic cylinder pressure in a hydraulic cylinder connected to a machine implement is greater than a threshold pressure value, and an indication that the machine is not accelerating.

* * * * *